United States Patent
Pomplun (10) Patent No.: US 7,464,003 B2
(45) Date of Patent: Dec. 9, 2008

(54) SYSTEM AND METHOD FOR CHANGE DETECTION OF INFORMATION OR TYPE OF DATA

(75) Inventor: Kevin Pomplun, Palo Alto, CA (US)

(73) Assignee: Skygrid, Inc., State College, PA (US)

( * ) Notice: Subject to any disclaimer, the term of this patent is extended or adjusted under 35 U.S.C. 154(b) by 0 days.

(21) Appl. No.: 11/843,813

(22) Filed: Aug. 23, 2007

(65) Prior Publication Data

US 2008/0052043 A1    Feb. 28, 2008

Related U.S. Application Data

(60) Provisional application No. 60/823,478, filed on Aug. 24, 2006.

(51) Int. Cl.
*G06F 15/00* (2006.01)
(52) U.S. Cl. ........................ 702/187; 702/189
(58) Field of Classification Search .................. 702/96, 702/97, 142, 147, 149, 187, 189
See application file for complete search history.

(56) References Cited

U.S. PATENT DOCUMENTS

2005/0058081 A1 *   3/2005   Elliott .................. 370/252

* cited by examiner

*Primary Examiner*—Edward R Cosimano
*Assistant Examiner*—Douglas N Washburn
(74) *Attorney, Agent, or Firm*—Paul Davis; Goodwin Procter LLP (57) ABSTRACT

A method is provided of determining the how information from any information system changes over time. WebPages A through WebPages Z with nodes A through Z, are located, where A through Z are integers. Timestamp values for each of a node from A through Z are retrieved. Timestamp values from A are subtracted to create a denominator time value. A distance between the nodes A through Z is determined by calculating a number of edges in the digraph to create a numerator value. The distance is divided by the denominator time value to provide a velocity value.

10 Claims, 4 Drawing Sheets

SYSTEM AND METHOD FOR CHANGE DETECTION OF INFORMATION OR TYPE OF DATA

CROSS-REFERENCE TO RELATED APPLICATIONS

This application claims the benefit of U.S. Application Ser. No. 60/823,478 filed Aug. 24, 2006, which application is fully incorporated herein by reference.

BACKGROUND

1. Field of the Invention

This invention relates generally to systems and methods for determining how information from any information system changes over time, and more particularly, determining how information from the internet changes over time.

2. Description of the Related Art

Technology development has centered around the Internet for the past decade, and almost a billion people are currently online. One of the leading developments continues to be information retrieval. Leading search engines let users search through 10's of if not 100's of billions of documents and return results judged by some metric of relevance. The leading commercial search engines have become very good at matching keywords and analyzing link structure to determine how relevant a result is to a user. The online advertising business has also steered the technology away from some of the more traditional academic foci for information retrieval and focused on how to monetize keywords.

Today the criteria for a good search engine is relevance. Relevance is a fuzzy word and does not let you know if a document has a negative or positive connotation or if that document is reaching more or less people. Since the beginning of civilization, people have made decisions based on how good or bad something is and based on how many people are aware of the information. It seems odd that such critical information would be missing from search engines, but this is a result of commercial focus on keywords.

Precision, recall, fallout, accuracy and error are all metrics used to determine how well an information retrieval system works. Initially search engines would return based just on words, then on citation ranking and currently are focusing on ranking algorithms. All of these approaches have used the five metrics of precision, recall, fallout, accuracy and error with a focus on a single independent variable—keywords. By using new independent variables, a much richer understanding of information is available.

There is a need for systems and methods that compute changes in information over time. There is a further need for systems and methods that provide a computable way to globally determine any change in any type of data.

SUMMARY

Accordingly, an object of the present invention is to provide a system and methods that computes changes in information over time.

Another object of the present invention is to provide systems and methods that accept any input from any system and quantifies its physical or quantum state.

Yet another object of the present invention is to provide systems and methods that determine the state space and its transitive state space shifts for any data.

A further object of the present invention is to provide systems and methods that see any change for any type of data and have a unique view of the series of events that define an object.

These and other objects of the present invention are achieved in a method of determining the how information from any information system changes over time. WebPages A through WebPages Z with nodes A through Z, are located, where A through Z are integers. Timestamp values for each of a node from A through Z are retrieved. Timestamp values from A are subtracted to create a denominator time value. A distance between the nodes A through Z is determined by calculating a number of edges in the digraph to create a numerator value. The numerator value is divided by the distance to provide a velocity value.

In another embodiment of the present invention, a method is provided of determining how information from the internet changes over time. At least a first webpage with a first node and a second webpage with a second node are located. A first time stamp value is retrieved of when the first node was published. A second time stamp value is retrieved of when the second node was published. The second time stamp value is subtracted from the first time stamp value to create a denominator time value. A distance is determined between the first and second nodes. The distance is divided by the denominator time value to provide a velocity value.

DETAILED DESCRIPTION

The present invention is a program that measures information physics. The system ("InformationVelocity") includes seven separate modules, all of which at the final time of filing may be considered separate inventions, for different systems and methods of scoring data in a linked database. Each module provides an input or output to help determine the physics of any piece of information. Information physics are determined by 1) intelligent crawling agents; 2) virtual graphs built within the database; 3) velocity engines; 4) sentiment engines; 5) closewords; 6) offline retrieval systems and 7) time deterministic systems.

The first module, ICA, or intelligent crawling agent, is a webcrawler that uses a set of learned criteria to retrieve the sources of data that are used by the rest of the system. The InformationVelocity system begins by spawning a process called Info_2_System that aggregates two types of data structures. The first data structure type is RSS, which passes XML content to the system of the present invention. The second data structure type is Atom, which also passes XML content to the system of the present invention. This is called a pull process, because the system pulls content from different online information sources into the system of the present invention.

In another embodiment of the present invention, the InformationVelocity system collects anything without an RSS or Atom data structure by crawling. Any content source that does not export data anywhere outside of it's immediate url, is considered crawlable by the InformationVelocity system.

The first part of any information source collected is the "SRC" or root url for the information source. In traditional web terminology this has also been called a homepage. From the root url, the present invention can collect more information about the SRC.

The second part of any information source collected are the "NIs" or News Items. It is a single, identifiable piece of information that is created by and hosted by the owner of the SRC. "NIs" are always a subset of the SRC. Each information source can only have one SRC or root url and from there a user can navigate to all of the "NIs". Using the magazine Time as an analogy, the publication title "Time" would be the SRC (always stays the same) and all of the articles would be "NIs" (constantly being added to).

The second module is the virtual graphs built within the database, the SRCs provide nodes to build a graph of all of the root urls and the NIs provide nodes to build a graph of all of the new information that is created frequently by these sources.

The system of the present invention is built vertically. The vertical design allows the information indices to be built upon more precise criteria. For example the system of the present invention can build a finance index vertically from the RSS, Atom and crawled content from within the financial domain. By using our sentiment engines (referred to below as the fourth module) we're able to determine if a particular type of data would usually be considered to be part of a domain. For example, root url of Tim Berners-Lee weblog is usually considered to be part of the technology domain.

In another embodiment of the present invention, InformationVelocity finds all matching NI to the query the user enters into the interface, stored in the database as a <stormId>, and then starts building a graph. This "NI graph" shows which NIs (all sharing the common value of containing some information related to the <stormId>) are connected and how they are connected. The NI connections are known as links in the present invention.

The first of two links used to build the "NI graph" is an inbound link. If the InformationVelocitySystem retrieves an NI, which is written at a first NI and in this NI, the present invention links to a second NI (for example an NI suggesting "have you read Tim Berners-Lee's thoughts on Net Neutrality, you can do so by clicking here— . . . "), and Tim Berners-Lee weblog would be the recipient of an inbound link from the present invention. With two NIs and the direction of which NI is connecting to the other NI the present invention creates a digraph. The first NI would be Node_A and the second NI would be Node_B. It is obvious that Node_A is referencing Node_B and that makes Node_B the recipient of an inbound link from the agent Node_A. This gives the system of the present invention an ordered pair of vertices (Node_A, Node_B) with an edge Directed from Node_A to Node_B.

The second of two links used to build the "NI graph" is an outbound link. If the InformationVelocity_System retrieves an NI with a first url and in this NI, the first url contains a link to a second url the present invention creates an outbound link from the first url to the second url.

In another embodiment of the present invention, the "NI behavior" module looks at all activity for each node in the "NI graph. The present invention looks at how the number of comments, to an NI, change over time, how javascript changes over time, how the structure of the page changes.

In another embodiment of the present invention, the "SRC quantity" uses a synchronous process to retrieve information about how many users the information source reaches, how the information source ranks relative to other information sources and several other types of information based on quantitative metrics. The "SRC quantity" only relates to the SRCs, or root urls.

In another embodiment of the present invention, a "SRC graph" is created. The "SRC graph" is less granular than the "NI graph". A lot of the information sources that the present invention looks at display the other information sources that are referred to. Based upon this information, when the present invention builds a graph "node clusters" become apparent. Just as in sociology, what is referred to as "Dunbar's number", certain thresholds of interactivity between information sources called "node clusters" can be viewed.

In another embodiment of the present invention, the InformationVelocity_System creates a semantic index. Within the semantic index, the InformationVelocity_System calculates different properties of the semantic data in order to provide the algorithm of the present invention more outputs to better classify the information. For example, by recognizing the average frequency of a word across all of our information sources the present invention can create and compare the historical mean to the most recent frequency of the word and determine a relative weight for the information (similar to Zipf's law distributions). The present invention also can measure levels of use activity at the information source level and from our system. From this data, the InformationVelocity_System can use pattern recognition to determine different levels of importance.

In accordance with yet another implementation consistent with the present invention, the third module, velocity engines are a method for using virtual graphs to determine the speed and direction information is traveling over time.

In another embodiment of the present invention, the "NI velocity" module computes the velocity of an NI. Velocity equals distance divided by time (v=d/t). The denoNIminator time, is determined by retrieving the timestamp from a 1st information source indicated by a series of different tags. For example, Atom uses <issued>, <created> and <modified> tags to give three different times. The present invention then retrieves the timestamps from a second information source and calculates the difference between the two. The numerator, or distance, is computed by the number of edges between nodes. The present invention can see how fast information is traveling between information sources as well as how fast a <stormId> is traveling from the calculated velocity data. The system of the present invention is capable of looking at two different <stormId> queries and comparing their velocity with our StormWatch application, in order to see which query is moving faster.

In another embodiment of the present invention, "SRC velocity" takes a node cluster and measures its rate of expansion or contraction. For example, if the present invention can see that a node cluster has historically had 10 members and today has 12, then it knows the rate of expansion has increased. Because of this increase in the rate of expansion the InformationVelocity_System gives more weight to a <stormId> query that is part of an expanding node cluster. The system of the present invention gives more weight because it indicates that the information is significant enough to change the graph structure for the SRCs.

In another embodiment of the present invention, applying differential geometry, group theory and dynamical systems theory determines how the graph changes over time.

In another embodiment of the present invention, the fourth module, NLP engines are Natural Language Processing modules. The present invention uses a series of modules to create a rules based system that can determine context. There are many main parts to the "NLP modules" used in the system of the present invention.

The first part of the "NLP module" system is a parser that retrieves a section of text from an information source and determines which parts of speech are found in each sentence. For example, the parser reads the phrase "great ideas grow endlessly" as "(S:(NP:(ADJ: Great) (NOUN: ideas)) VP: (VERB: grow) (ADV: endlessly))))". Another part of the "NLP module" system is the feature database. Based upon the results of the parsing process different parts of text will start to create "features". A feature is just a way to put information into a very specific classification. For example the above sentence "great ideas grow endlessly" would generate a feature "ideas~nns~amod~great~jj. This feature is then assigned a tag of "good" and when the InformationVelocity_System reads any new information with a matching feature "ideas~nns~amod~great~jj", the new information would be assigned a tag of "good" as a result.

Another part of the "NLP module" system is the feature classification process. The feature classification process determines whether features are classified as good, bad or neutral. Within this classification a gradient score determines how good or how bad or how neutral the features are. The gradient scores range from 0.0000 to 1.0000. For example a feature could be determined to be 0.8 good+0.2 neutral.

The final part of the "NLP module" system is the sentence classification process. At the feature level, it is most common to have a single score (ie 1.0 good). At first glance this would seem that the system is oversimplifying context, but remembering that many features make up a sentence, leads to the need for a sentence classification process. For example if you have a sentence with three features, feature one is 1.0 good and features 2and 3 are both 1.0 bad, then you have a sentence classification as 0.3333 good (1.0 out of 3.0 total) and 0.6666 bad (2.0 out of 3.0 total).

In another embodiment of the present invention, the fifth module, CloseWords, determines interesting words related to a user query. On a Cartesian coordinate plane, a user query is generated as an ideal (with xy coordinates (1,1)). The x value is the number of results and the y value is the number of times the query appears in the result set. Many natural language processing systems have used the tf-idf (term frequency—inverse document frequency) metric to determine other outputs. By comparing the ideal coordinates of (1,1) with the each member of the result set coordinates, the words that are closest are determined to be CloseWords.

In another embodiment of the present invention, the sixth module, offline retrieval system, is a system for accessing all information available to the instant the user stopped being online, while offline. The system includes locally storing a database of all information in InformationVelocity on a user's local machine and making the information available offline. The user can receive all information from InformationVelocity as if she or he were online and time had stopped at the instant she or he was no longer online.

In another embodiment of the present invention, the seventh module, time deterministic systems, a method for determining how any information has changed over time; determining information about any content source at an initial point in time, later determining information about any content source at a later point in time; computing the difference the same piece of information has at two points in time to determine any changes. In accordance with a further implementation consistent with the present invention, a method for determining time changes for any information source by generating Minkowski spaces. Specifically Bloch spheres are determined as coordinates of a particular piece of information at a given instant. Determining all vectors for any information source, all state spaces from origin to present are generated, and the complete set determines the time-change manifold. Generating separate spacetime instances gives a surprisingly simple way to determine complex behavior and information physics.

Figure 1:
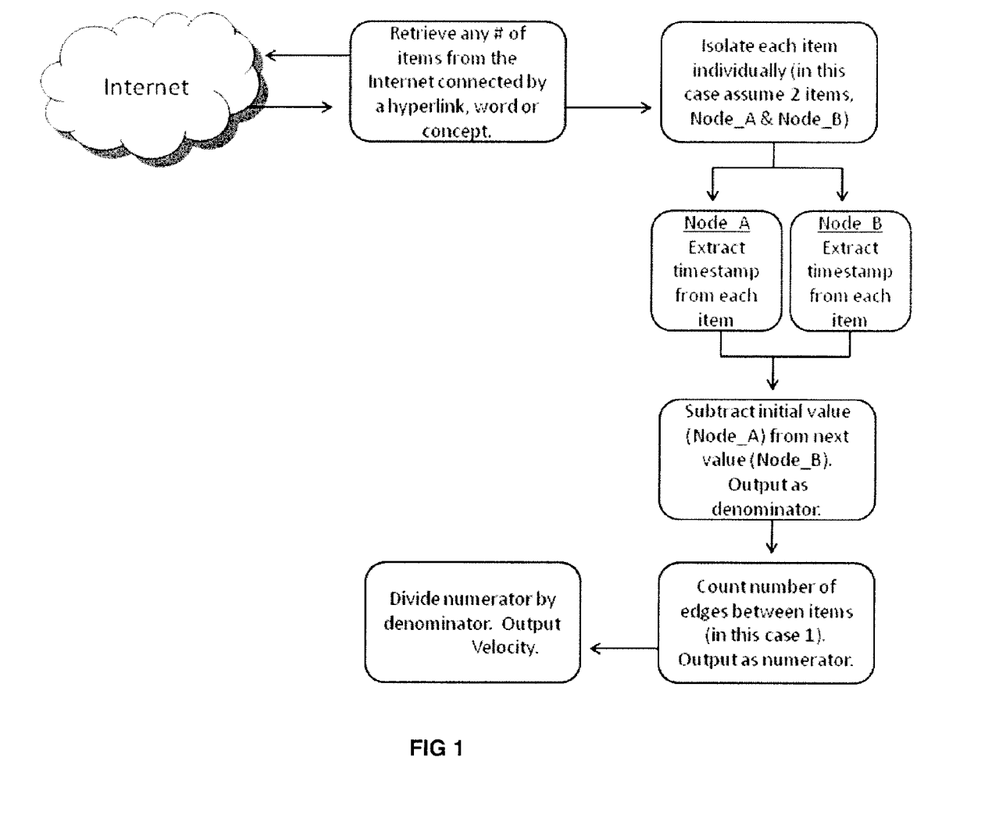
FIG. 1 is a flow chart illustrating gathering information and assigning sentiment value.
Figure 2:
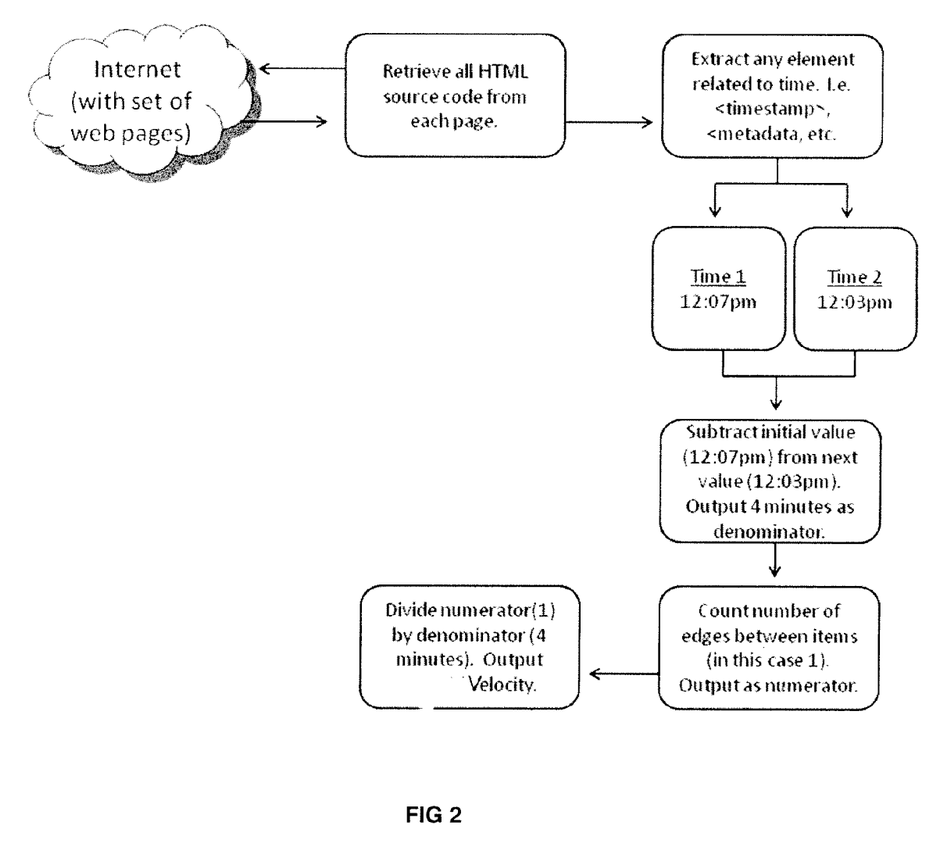
FIG. 2 is a flow chart illustrating gathering information and assigning sentiment value that first gathers webpages from the Internet and puts each unique webpage in a file.

Referring to the flow charts of FIGS. 1 and 2, a method is provided for determining how information such as text, audio, photographs, video, any transmission of any type from any information system, including but not limited to the internet, RFID, UPC, and any form of data changes over time. Examples of changes include but are not limited to, growth, decay or maintenance of, or any other physical or quantum state, and the like. FIG. 1 shows a system for gathering information and assigning sentiment value. The system first gathers webpages from the Internet (it can gather data from any information source), then puts each unique webpage in a file. From these files it extracts the timestamps when each page was published or updated. The timestamps are then subtracted from each other to compute the denominator of a fraction. The number of pages are then subtracted from each other to compute the numerator of the said fraction. The fraction is then resolved to a single value to show the InformationVelocity.

In one embodiment web pages A through WebPages Z are located with nodes A through Z, where A through Z are integers.

From these files it extracts the text and creates a sentiment pair consisting of a sentiment, and an object. For example a page positively describing the programming language Python, would extract a pair indicating the sentiment was "positive" and the object was "Python". The pair would have an appearance as follows: (positive, Python). The object in the page (in this case "Python") is them matched with an ad relevant to the object. The matched ad is then sent to another webpage using ads technology to display ads about that other webpage.

Computer software is used to collect each webpage and make it available to store, search, organize, edit, publish, share, view, or being transmitted in any other form. In this instance each webpage is determined to be a node. Timestamp values are retrieved for each node from A through Z. From each node the source code (or in other instances any form of where information about time is stored) is retrieved and the timestamp is extracted. Timestamp values are extracted from A to create a denominator time value. In one embodiment, <issued>, <created> and <modified> tags and other indication of time is used to determine the timestamp. It will be appreciated that other methods can be utilized to determine the timestamp including but not limited to using a sitemap protocol to gather XML tags, nothing that all data values in a sitemap must be entity-escaped and the file must be UTF-8 encoded, and the like. Examples of these tags could include <lastmod>, <changefreq>, and any other indication of time.

A distance between the nodes A through Z is then determined by calculating the number of edges in the digraph to create a numerator value. The numerator value is then divided by the denominator to provide a velocity value.

In one embodiment, the velocity value is used to determine how a producer, receiver, observer or transmitter, or object, event, or agent of information changes over time.

In another embodiment, the velocity value is used to determine how consumers of information changes over time.

In one embodiment, first and second nodes are located at first and second webpages respectively, as illustrated in the first flowchart above. A first timestamp value of when the first node was published is retrived and a second timestamp value of when the second node was published is also retrieved, as illustrated in FIG. 2.

Again, by subtracting the second time stamp value from the first time stamp value a denominator time value is created. A distance between the first and second nodes is determined. By dividing the distance by the denominator time value a velocity value is created.

It will be appreciated that time stamps from more than two web pages can be retrieved. The distance is the shortest distance between the first and second nodes. The number of edges between the first and second nodes is determined.

In various embodiments, the velocity value is a velocity of RFID's, supply-changing logistics, consumer packaged good purchase rates, UPC, advertisements, operating systems, computer applications, mobile information systems, networks, interactive video game devices, game consoles, game controllers and software for operating games, videos, photographs, audio, digital media in any form, any electronic transmission of information, and the like. In another embodiment, advertisements can be created.

Figure 3:
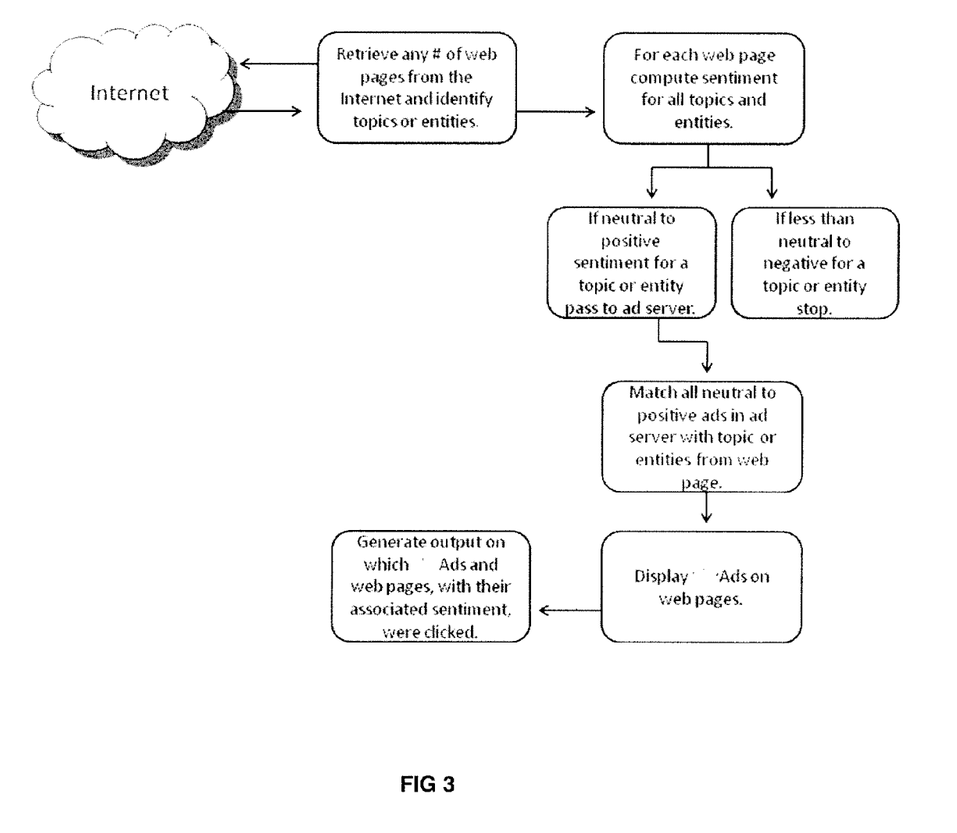
FIG. 3 is a flow chart illustrating matching all neutral to positive ads in an ad server with topic or entities from a web page.

In this embodiment, illustrated in FIG. 3 the system creates advertisements by identifying sentiment information for an advertisement, analyzing the content of a target document to identify the sentiment of a list of one or more topics for the target document, comparing the targeting information to the list of topics to determine if sentiment exists, and determining that the advertisement is relevant to the target document if the sentiment is of a neutral to positive classification and irrelevant if negative.

The system for creating the advertisements involves methods and apparatus for determining advertisements that have sentiment and are have neutral to positive sentiment for a given document. Alternately advertisements that have negative sentiment or documents that have negative sentiment will not have any ads displayed, and will be classified as negative sentiment destinations. In one implementation, the document is a web page and the advertisements are electronic files that are capable of being rendered on that web page. A set, such as a list, of sentiment topics corresponding to the web page is generated by analyzing the sentiment of the web page. The list of sentiment topics is compared to target sentiment information associated with the advertisements (e.g. advertisements classified by degrees of neutral to positive sentiment) to determine which of the advertisements are neutral to positive in sentiment for the web page. Some or all of these sentiment classified advertisements may then be associated with the web page so that they may be rendered (e.g., displayed) with the web page.

The system for creating the advertisements ensures advertisers only advertise where they receive positive responses and attention.

Additionally, the system for creating the advertisements can determine increasing positive sentiment for their own ads, and use the rate of increase as an indicator of which web pages are most valuable to place ads on. Similarly, the system for creating the advertisements can inform advertisers about any other companies sentiment relative to their own, and they can determine purchasing thresholds, frequencies and any other dynamic value to govern their activity, to place ads on web pages.

In another embodiment, Source Influence can be created.

Source Influence is an information system, architecture, and algorithm to determine the factual accuracy and reliability of any content generator over time.

Figure 4:
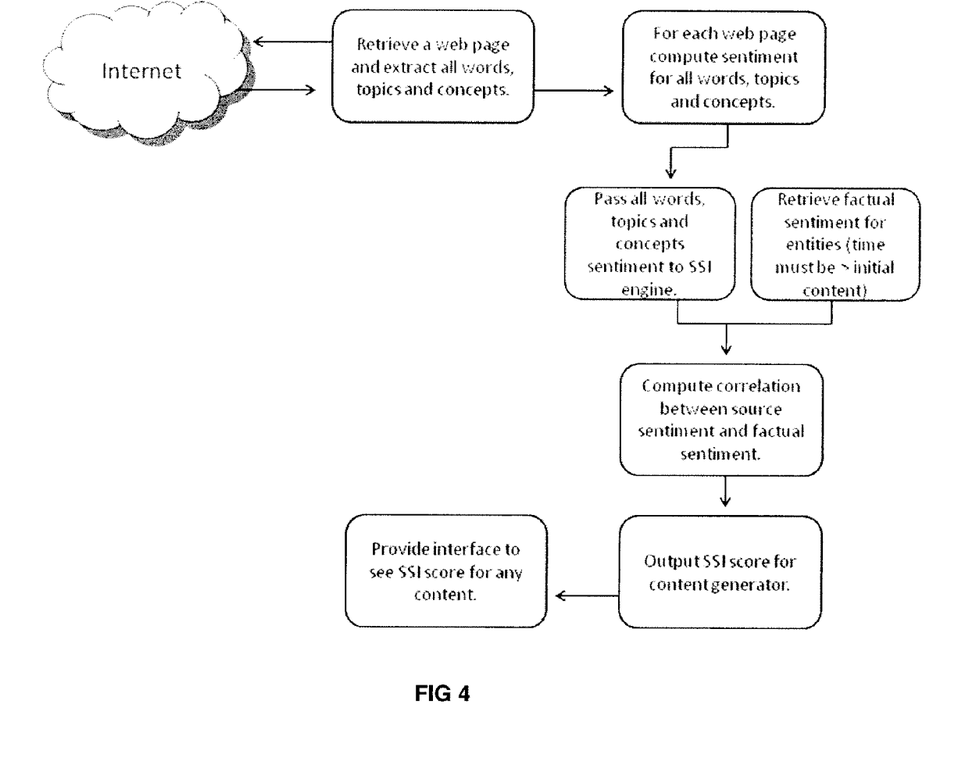
FIG. 4 is a flow chart illustrating computing a correlation between source sentiment and factual sentiment to output an SSI score.

By applying Sentiment, the system can determine how often the Sentiment from the content generator is accurate and reflects the factual occurrences about the content, as shown in FIG. 4.

Source Influence retrieves any type of content and then extracts a set of words, topics, and concepts. Each word, topic or concept is given a Sentiment score based on the sentiment present in the content generated. For example, if a content provider (e.g. The Wall Street Journal) suggested that a company (e.g. Nintendo) would outperform another company (e.g. PlayStation) in console sales, SSI would first determine Nintendo's Sentiment (mostly positive) relative to PlayStation's Sentiment (most negative), and both relative to the topic identified (i.e. console sales).

Source Influence stores the words, topics, and concepts and then provides automates the matching of those entities with the factual events. In this example, the Sentiment from The Wall Street Journal article would then get compared to the console sales in the window of time suggested by the content. If The Wall Street Journal was correct, it would receive an increased Source Influence Score. If The Wall Street Journal was incorrect, it would receive a decreased Source Influence Score.

Over any window of time, Source Influence can provide access to an information system that would determine the entire range of Source Influence scores for any content generators selected. Any content generator at any point in time, at any geographic location, would be instantly able to display its Source Influence. Similarly, any content reviewer would be able to view the same information.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method of determining how information from any information system changes over time, comprising:
   locating web pages A through Z with nodes A through Z in a digraph, where A through Z are integers and an edge between two nodes in the digraph indicates that two web pages corresponding to the two nodes are linked;
   retrieving timestamp values for each of a node from nodes A through Z;
   subtracting timestamp values of node Z from A to create a denominator time value;
   determining a distance between the nodes A through Z by calculating the number of edges in the digraph to create a numerator value; and
   dividing the distance by the denominator value to provide a velocity value.

2. A method of determining how information changes from the internet changes over time, comprising:
   locating at least a first webpage with a first node and a second webpage with a second node in a digraph, wherein an edge between two nodes in the digraph indicates that two webpages corresponding to the two nodes are linked;

retrieving a first timestamp value of when the first node was published;

retrieving a second timestamp value of when the second node was published;

subtracting the second timestamp value from the first timestamp value to create a denominator time value;

determining a distance between the first and second nodes in the digraph; and dividing the distance by the denominator time value to provide a velocity value.

3. The method of claim 2, wherein timestamps from more than the first and a second web pages are retrieved.

4. The method of claim 2, wherein the distance is the shortest distance between the first and second nodes.

5. The method of claim 2, wherein a number of edges between the first and second nodes is determined.

6. The method of claim 2, wherein the changes are selected from at least one of, growth, decay and maintenance of a same state.

7. The method of claim 2, wherein the velocity value is used to determine how a producer, receiver, observer or transmitter, of information changes over time.

8. The method of claim 2, wherein the velocity value is used to determine how any type of information changes over time.

9. The method of claim 2, wherein the velocity value is a velocity of at least one of, RFID's, supply-changing logistics, consumer packaged good purchase rates, UPC, advertisements, operating systems, computer applications, mobile information systems, networks, interactive video game devices, game consoles, game controllers and software for operating games, videos, photographs, audio, digital media in any form and electronic transmission of information.

10. The method of claim 2, wherein, <issued>, <created> and <modified> tags and other indication of time is used to determine the timestamp, wherein the other indication of time is any HTML, XML, WML, or any markup or programming language that contains code to indicate a time value.

\* \* \* \* \*

UNITED STATES PATENT AND TRADEMARK OFFICE
CERTIFICATE OF CORRECTION

PATENT NO.        : 7,464,003 B2
APPLICATION NO.   : 11/843813
DATED             : December 9, 2008
INVENTOR(S)       : Kevin Pomplun Page 1 of 1

It is certified that error appears in the above-identified patent and that said Letters Patent is hereby corrected as shown below:

Fig. 4, last box in figure--word "generator" should appear after "content" and before the period.

col. 2, lines 14-15--"The numerator value is divided by the distance" should instead read "The distance is divided by the numerator value."

col. 3, line 4--the """ should be deleted from "it's"

col. 5, lines 48-49--"the" should be deleted after "with" and before "each member"

col. 6, line 16--the "," after "limited to" should be deleted.

col. 6, line 38--"is them matched" should be changed to "is then matched"

col. 6, lines 66-67--"changes" should be corrected to "change"

col. 7, line 38--the word "are" should be deleted.

col. 7, line 64--the word "companies" should be corrected to "company's"

col. 8, line 20--"provides" should be deleted.

Claim 2 preamble--the first appearance of the word "changes" after the word "information" and before the word "from" should be deleted.

Signed and Sealed this

Thirteenth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,464,003 B2
APPLICATION NO. : 11/843813
DATED : December 9, 2008
INVENTOR(S) : Kevin Pomplun It is certified that error appears in the above-identified patent and that said Letters Patent is hereby corrected as shown below:

Fig. 4, last box in figure--word "generator" should appear after "content" and before the period.

col. 2, lines 14-15--"The numerator value is divided by the distance" should instead read "The distance is divided by the numerator value.".

col. 3, line 4--the """ should be deleted from "it's".

col. 5, lines 48-49--"the" should be deleted after "with" and before "each member".

col. 6, line 16--the "," after "limited to" should be deleted.

col. 6, line 38--"is them matched" should be changed to "is then matched".

col. 6, lines 66-67--"changes" should be corrected to "change".

col. 7, line 38--the word "are" should be deleted.

col. 7, line 64--the word "companies" should be corrected to "company's".

col. 8, line 20--"provides" should be deleted.

col. 8 claim 2, line 61--the first appearance of the word "changes" after the word "information" and before the word "from" should be deleted.

This certificate supersedes the Certificate of Correction issued October 13, 2009.

Signed and Sealed this

Third Day of November, 2009

David J. Kappos
*Director of the United States Patent and Trademark Office*